United States Patent [19]

Gasman

[11] Patent Number: 4,728,540

[45] Date of Patent: Mar. 1, 1988

[54] PROCESS FOR INTRODUCING USEFUL ADDITIVES INTO ALREADY MANUFACTURED AND FABRICATED FLEXIBLE VINYL PRODUCTS

[76] Inventor: Robert C. Gasman, 60 Kitchell Lake Dr., West Milford, N.J. 07480

[21] Appl. No.: 3,563

[22] Filed: Jan. 14, 1987

[51] Int. Cl.$^4$ ............................................... B05D 3/02
[52] U.S. Cl. .............................. 427/385.5; 427/389.9; 427/393.1; 427/393.5; 427/412
[58] Field of Search ................. 427/393.5, 385.5, 140, 427/389.9, 393.1, 412

[56] References Cited

U.S. PATENT DOCUMENTS

| | | | |
|---|---|---|---|
| 4,049,822 | 9/1977 | Rei et al. | 524/177 X |
| 4,232,076 | 11/1980 | Stetson et al. | 427/270 X |
| 4,264,643 | 4/1981 | Granata et al. | 427/302 X |
| 4,277,427 | 7/1981 | Kaminski et al. | 427/373 X |
| 4,284,444 | 8/1981 | Bernstein et al. | 427/384 X |
| 4,404,296 | 9/1983 | Schäpel | 524/377 X |
| 4,595,617 | 6/1986 | Bogdany | 428/95 |
| 4,615,910 | 10/1986 | Gasman | 427/140 |
| 4,617,325 | 10/1986 | Knobel et al. | 524/127 X |

*Primary Examiner*—Thurman K. Page
*Attorney, Agent, or Firm*—Robert C. Gasman

[57] ABSTRACT

A process is described for introducing into already manufactured and fabricated vinyl products special function additives which impart to the vinyl product some useful property which it did not possess before as, for example, UV resistance, mildew resistance, etc. The process involves the use of vinyl plasticizers in which the additives are readily soluble to convey the additives into already manufactured and fabricated vinyl plastic products. Special function additives include UV stabilizers, mildewcides, fragrances, fungicides, antifogging agents, biocides, disinfectants, lubricants, antioxidants, water repellents, thickeners, surfactants, bacteriacides, vinyl heat stabilizers, antistats, release agents, anti blocking agents and the like. The process involves spreading a uniform application of a solution or water emulsion of a solution of a special function additive in a liquid plasticizer on the vinyl product surface at ambient temperature. Then the product is allowed to remain undisturbed for up to thirty days at ambient temperature when the plasticizer solution will have been absorbed into the interior of the vinyl product as evidenced by the surface of the vinyl feeling non tacky and dry to the touch.

19 Claims, No Drawings

PROCESS FOR INTRODUCING USEFUL ADDITIVES INTO ALREADY MANUFACTURED AND FABRICATED FLEXIBLE VINYL PRODUCTS

BACKGROUND OF THE INVENTION

Flexible vinyl sheet, film, and flexible vinyl coated fabric (hereinafter referred to as "vinyl products(s)") are very versatile materials and find a wide variety of applications. Curtains for windows and showers, coverings for home and office furniture, automotive seat covers, single ply flexible vinyl membranes for covering industrial roofs, wall coverings, shoe uppers, purses and agricultural sheet illustrate the diversity of uses for this material.

Despite its wide utility there are some problems associated with the use of flexible vinyl in many applications. One of the more serious problems involves cracks or tears that develop in flexible vinyl products after they have been exposed to heat and or sunlight for several years. These cracks and tears generally mark the end of the useful life of the vinyl. In addition to cracking and tearing, flexible vinyl products frequently exposed to moisture and high humidity such as flexible vinyl roofing membranes are susceptible to becoming covered with biological growth.

Already manufactured flexible vinyl products can develop cracks and tears or become covered with biological growth because the original manufacturer elected not to include the costly additives needed to prevent these problems. For example, it is known in the art that special function additives such as UV stabilizers, mildewcides, vinyl heat stabilizers, and the like can be incorporated in the vinyl plastic at the time when the vinyl plastic compound is being manufactured. Conditions which must be met in order to incorporate special function additives in vinyl products at the time of manufacture according to the Plastics Engineering Handbook include heating the loose mixture of vinyl resin and additives of 300° F. to 350° F. temperatures in order to fuse the vinyl dispersion, use of high shear, low speed mixing to disperse the resin in the plasticizer, and use of special very fine particle size, high porosity resins known as dispersion grade resins. But it is also known that such special function additives cannot be incorporated in vinyl products after they have already been manufactured and fabricated. Some additives are heat sensitive and would decompose if added during the manufacture of flexible vinyl products.

A need exists for a method for introducing useful additives into already manufactured and fabricated flexible vinyl products. U.S. Pat. No. 4,284,444 attempts to respond to this need by disclosing a method for imparting to already manufactured and fabricated polymer films and fabrics antibacterial, electrical conductivity enhancing, antistatic, animal repellent, antifungal, and insecticidal properties by applying to the surface of the product selected activating agents. The activating agents have the ability to migrate by themselves unassisted into the body of the already manufactured and fabricated polymer product to impart an effective level of activity. Although this method has proven useful it is not without its disadvantages. For example, when certain U.S. Pat. No. 4,284,444 activating agents are applied to the surface of a flexible vinyl product they have proven to be ineffective according to the information provided in U.S. Pat. No. 2,284,444. It is reported in U.S. Pat. No. 4,284,444 in example 85 (Table 4) that tributyl tin acetate was not an effective activating agent in the process of the U.S. Pat. No. 4,284,444 invention as evident from the fact that the tributyl tin acetate underperformed (it did not provide effective activity) the control (example 77). However, example 5 of the present application shows that tributyl tin acetate is effective when applied by the process of the present invention.

The activating agents of U.S. Pat. No. 2,284,444 may be applied to the polymeric product as a component of a polyvinyl chloride plastisol, as a solution in a volatile, non permanent carrier liquid containing a binder resin, or the activating agents may be applied neat. It is a disadvantage to have to apply U.S. Pat. No. 4,284,444 activating agents to a polymeric product as part of a vinyl plastisol because vinyl plastisols must be fused at elevated temperatures after application in order to perform their function.

It is frequently not possible to heat already manufactured and fabricated vinyl products such as a vinyl fabric covered chair or an automobile with a vinyl roof to elevated temperatures without damaging other portions of the product. The volatile solvent method of introducing activating agents also has its disadvantages. In addition to the potential for damage to the polymeric substrate from attack by the volatile solvent, this method for applying U.S. Pat. No. 4,284,444 activating agents suffers from the disadvantage that polymeric products so treated are left coated with a binder resin that is not necessarily desired. The number of activating agents which when applied neat to a polymeric product will then migrate into that product at economically significant rates is extremely small.

SUMMARY OF THE INVENTION

Now it has been discovered that flexible polyvinyl chloride plasticizers can function as permanent, nonvolatile carrier liquids to convey special function additives into already manufactured and fabricated vinyl plastic products at ambient temperatures. Thus, it is possible to incorporate such problem preventative special function additives into already manufactured flexible vinyl products by first dissolving the additive in a suitable vinyl plasticizer and then applying the solution of the additive in the plasticizer to the surface of the flexible product at ambient temperature and allowing the solution to be absorbed over time at ambient temperature by the vinyl product. Thus in the process of this invention the liquid plasticizer and the special function additive are both permanently incorporated in the flexible vinyl product. It is believed that the vinyl plasticizers carry special function additives into flexible PVC by temporarily and reversibly swelling the surface of the PVC product thereby rendering the surface substantially more permeable to the inward diffusion of the special function additives and the plasticizer itself. Once the plasticizer has been completely absorbed by the flexible PVC product, the surface swelling is reduced and the PVC surface returns to approximately its initial state of permeability.

An example of how this invention might be practiced is given below. Vinyl roofs of older cars frequently become completely disintegrated before the car is scrapped owing to the molecular degradation of the vinyl polymer in the roof by the ultraviolet component of the solar radiation striking the car roof. By applying to the vinyl roof a solution of UV absorber in a plasticizer, the UV absorber is carried after a time by the plasticizer into the interior of the vinyl roof where now it serves to protect the roof from degradation by solar UV radiation. Alternatively, the plasticizer solution of the additive may be emulsified in water and applied to the vinyl product.

OBJECT OF THE INVENTION

It is the object of the present invention to provide a novel method for reconditioning an already manufactured vinyl product.

Another object of the present invention is to provide a method having a short treatment time for reconditioning an already manufactured vinyl product.

Another object of the present invention is to provide a method for reconditioning an already manufactured vinyl product that can easily be employed in the field.

Another object of the present invention is to provide a means for incorporating in PVC products additives which would decompose if introduced at the high temperatures required for compounding PVC plastics or for fusing PVC plastisols.

DESCRIPTION OF THE INVENTION

The method of the present invention contemplates preparation of the vinyl product to be reconditioned by first cleaning it with either a solvent or aqueous detergent solution to remove grease and other soils which might interfere with the wetting of the vinyl product surface by the plasticizer solution. Suitable cleaning solvents are those which will not attack vinyl products and include mineral spirits, hexane, heptane, VM&P naphtha, and the like. Suitable aqueous detergents include any household spray cleaner designated by the manufacturer on the label as suitable for vinyl. Detergent cleaing of vinyl should be followed by a rinse with clean water, followed by a period sufficient to allow thorough drying of the product before application of the reconditioning solution. Cleaning the product to be reconditioned is preferred, but the reconditioning solution can be absorbed right through the soil in many instances.

The reconditioning solution consisting of a special function additive dissolved in a suitable neat vinyl plasticizer is typically applied at levels of 0.002 to 0.2 lbs. per sq. ft. of vinyl surface. Multiple applications of the solution may be required to achieve the higher treatment levels. It is critically important that the solution does not come in contact with a shear cut or knife cut edge of the vinyl product. Initially the freshly applied reconditioning solution remains on the surface but eventually it is absorbed at ambient temperature into the interior of the vinyl product so that the initial "wet" and greasy feel from the fresh plasticizer solution application disappears as the solution is absorbed by the vinyl leaving the vinyl surface feeling non tacky and dry to the touch.

Not just any additive qualifies as a special function additive. A special function additive is one which imparts to the vinyl product some useful property which it did not possess before such as, for example, UV resistance or mildew resistance and the like. In addition a special function additive is one which is at least soluble to the extent of 0.001 pphr. at 4° C. in the plasticizers of this invention, and one which at a minimum concentration of 0.001 pphr. does not increase the absorption time of the plasticizer reconditioning solution at room temperature beyond thirty days. Suitable special function additives include UV stabilizers, bacteriacides, vinyl heat stabilizers, surfactants, insecticides, anti-fogging agents, biocides, disinfectants, fungicides, thickeners, antioxidants, fragrances, mildewcides, lubricants, germicides, antistats, release agents, water repellents, and antibocking agents, etc. Suitable UV stabilizer special function additives include 2-hydroxy-4-n-octoxybenzophenone, 2-hydroxy-4-methocybenzophenone, 2(2'-hydroxy-5'-methoxyphenyl)benzotriazole, 4-hydroxy-2,2,6,6-tetramethyl-1-piperidineethanol, 2-ethylhexyl-2-cyano-3,3-diphenyl acrylate, {2,2-thiobis(4-tert-octyl phenolato)}-n-butylamine nickel II Suitable fragrances include butylmethyldihydroxycinnamic aldehyde, citral, citral dimethylacetal, dimethyl hexanediol, citronellal, dihydromyrcenol, geraniol, isoeugenol acetate, hydroxycitronellal, isochomeric acid, 7-methoxy-3,7-dimethyloctan-1-al and phenyl propyl isobutyrate. Suitable antiblocking agents include stearic acid, methyl oleate, methyl stearate, butyl stearate, stearamide, olemide, and erucamide. Suitable special function additive mildewcides include 2-n-octyl-4-isothiazolin-3-one, and dibutyl tin oxide. Suitable special function additive bacteriacides include tributyl tin acetate and bis(tri-n-butyltin)sulfosalicylate. Suitable fungicides include tributyl tin fluoride, 1,4-bis(bromoacetoxy)-2-chlorothalonil, dinitroacetylphenyl crotonates, and zinc pyrithone. Suitable biodices include 3-bromo-1-chloro-5,5-dimethyl hydantion. Suitable disinfectants include dialkyl dimethylammonium halides. Suitable anti-fogging agents include the fatty acid monoesters of glycerine. Suitable lubricants include oleyl alcohol, tristearyl citrate, glyceryl tristearate and calcium stearate. Suitable antistats include N-ethyl-o,p-toluene sulfonamide. Suitable antioxidants include Bisphenol A. Suitable vinyl heat stabilizers include barium cadmium stearate, and dibutyl tin maleate. Suitable insecticides include dimethyl dichlorovinyl phosphate, 1-Naphthyl N-methyl carbamate, piperonyl butoxide, and (5-benzyl-furyl)-methyl 2,2-dimethyl-3-(2-methylpropenyl)cyclopropane carboxylate. Suitable surface tension lowering agents include include the ethylene oxide ether of a perfluorinated alcohol (Zonyl FSN-100, DuPont Co.), poly(dialkyl siloxane-co-alkylene oxide) block copolymers and the condensation product of octyl phenol with 9-10 moles of ethylene oxide which facilitates emulsification of the plasticizer carrier in water. Mixtures of special function additives can also be used, for example, a mixture of barium cadmium stearate, the diglycidyl ether of Bisphenol A, tris nonyl phenyl phosphite, and 2-hydroxy-4-n-octoxybenzophenone. Concentration of the special function additive in the plasticizer is usually limited only by the solubility of the additive in the plasticizer. If the solubility of the additive in the plasticizer is very high, then for purposes of this invention the upper limit of special function additive concentration in plasticizer is the highest concentration of additive that still allows the reconditioning solution to be completely absorbed within 30 days at room temperature.

Not just any liquid can function as a permanent carrier liquid in the process of the present invention. The permanent plasticizer carrier liquid of this invention must meet all of the following requirements: must have a vapor pressure of less than 150 mm Hg at 200° C., must have an absorption time at room temperature which is less than 10 days, must have a solubility parameter between 7.7 and 12.5 (calories/cc.)×0.5, must have a viscosity which is less than 79 cp. at 20° C., and must not physically or chemically attack flexible polyvinyl chloride products. Absorption time is the time required at a specified temperature for 1 gram of carrier liquid when uniformly spread over the vinyl side of 36 sq. in. of 1.55 lb./sq. yd. of commercial, flexible, vinyl fabric to be completely absorbed into the fabric. Many organic liquids will not work as carrier liquids in the process of this invention because they have excessively long absorption times even at room temperature. Organic liquids like, for example, toluene and ethyl acetate will swell flexible PVC and increase its permeability to special function additives but will not work as carrier liquids in the process of this invention because they do attack flexible PVC and have such high vapor pressures that they will evaporate before the special function additives have an opportunity to completely diffuse into flexible PVC products. Organic liquids which have 20° C. viscosities greater than 79 cp. will require an excessively long time to diffuse into flexible PVC products. Organic liquids which have solubility parameters outside the 7.7 to 12.5 range will not work as carrier liquids in the process of this invention because they have too low an affinity for flexible PVC to render it sufficiently permeable to the passage of special function additives. Solubility parameter is defined and the concept is described by "H. Burrell in "The Polymer Handbook, J. Brandrup and E. H. Immergut, Editors, Second Edition. pp IV 332–359, John Wiley and Sons, New York, N.Y. Examples of suitable plasticizer carriers include 2,2,4-trimethyl 1,3-pentanediol diisobutyrate, tributoxyethyl phosphate, diisodecyl azelate, dimethyl phthalate, dimethyl adipate, dibutyl phthalate, diethyl phthalate, and diisobutyl phthalate, dibutyl isophthalate, methyl phthalyl ethyl glycolate, dibutoxy ethyl phthalate, dibutyl adipate, the diester of phthalic acid with a commercial mixture of Oxo process hexyl alcohols, and mixtures of C4 thru C10 dialkyl phthalates and other plasticizers that meet the foregoing absorption rate, vapor pressure, solutility parameter, viscosity, and non attack requirements.

Plasticizer solutions may be applied to the vinyl surface to be reconditioned with a plasticizer solution saturated cloth, towel, paint brush, paint roller, sponge, and porous flexible urethane foam applicator for paint. In general any of the application means found useful for low viscosity liquids such as oil based paints, furniture polish, or liquid car wax may be used. Plasticizer solutions should never be placed directly on the vinyl surface but rather should always be applied to the vinyl with an applicator. Pouring the plasticizer solution directly on the vinyl surface may lead to a surface plasticizer pool which could either raise a blister or extract pigment from the vinyl surface before the pool can be spread over the vinyl surface. Application of plasticizer solution by dipping will not generally provide acceptable results owing to the potential for blistering, or pigment extraction problems mentioned earlier as well as the difficulty in predicting the quantity of plasticizer that will be absorbed for any given immersion period. Dipping vinyl fabric into plasticizer or plasticizer solution will cause the vinyl coating to separate from the fabric backing if the immersion period is long enough.

EXAMPLES

The following examples serve to further illustrate the invention.

EXAMPLE 1

A solution of 1 pphr. of a UV stabilizer, 2-ethylhexyl-2-cyano-3,3-diphenyl acrylate in 2,2,4-trimethyl 1,3-pentanediol diisobutyrate plasticizer, 2 g., was applied with a paint brush to a clean 6 in. ✕ 6 in. rectangle centered within an 8 in. ✕ 8 in. piece of 1.55 lbs./sq. yd. commercial, white, flexible vinyl fabric at room temperature. A uniform coating of solution over the vinyl surface was obtained indicating that the plasticizer solution readily wets the vinyl fabric. Tack free time or the time for the solution to be completely absorbed by the vinyl fabric was 47 hours. at room temperature.

Comparitive Example

A UV stabilizer, 2-ethylhexyl-2-cyano-3,3-diphenyl acrylate, 2 g., was applied to a clean 6 in. ✕ 6 in. rectangle centered within an 8 in. ✕ 8 in. piece of 1.55 lbs./sq. yd. commercial, white, flexible vinyl fabric at room temperature. The UV stabilizer did not wet the vinyl surface. No perceptible absorption of this neat UV absorber into the vinyl fabric occurred even after two weeks of contact time.

EXAMPLE 2

A solution of a mildewcide, 2-n-octyl-4-isothiazolin-3-one 45% in dipropylene glycol 1 pphr in 2,2,4-trimethyl 1,3-pentanediol diisobutyrate, 2 g., was applied to a 6 in. ✕ 6 in. rectangle centered within an 8 in. ✕ 8 in. piece of 1.55 lb./sq. yd. commercial, white, flexible vinyl fabric at room temperature. A uniform coating of solution over the vinyl surface was obtained indicating the solution readily wet the vinyl fabric. Complete absorption of the solution occurred within 16 hours at room temperature.

Comparative Example

A mildewcide, 2-n-octyl-4-isothiazolin-3-one 45% in dipropylene glycol, 2 g. was applied to a 6 in. ✕ 6 in. rectangle centered within a 8 in. ✕ 8 in. piece of 1.55 lb./sq. yd. commercial, white, flexible vinyl fabric at room temperature. The mildewcide did not wet the vinyl surface at all. No perceptible absorption of this mildewcide into the vinyl fabric occurred within twelve days at room temperature.

EXAMPLE 3

The following two solutions of several different vinyl stabilizers in plasticizer, 1 g., were applied to a 6 in. ✕ 6 in. rectangle centered within an 8 in. ✕ 8 in. piece of 1.55 lb./sq. yd. commercial, white, flexible vinyl fabric at room temperature. A uniform coating of the solutions over the vinyl surfaces was obtained indicating the solution readily wet the vinyl fabric. Complete absorption of the solutions occurred within twelve days at room temperature.

| Solution | Parts by weight | | | |
| --- | --- | --- | --- | --- |
| | A | B | C | D |
| 2,2,4-trimethyl 1,3-pentanediol diisobutyrate | 45 | | 45 | |
| Diisobutyl phthalate | | 45 | | 45 |
| Barium cadmium stearate | | | 2 | 2 |
| Epoxidized soybean oil | | | 5 | 5 |
| Triphenyl phosphite | | | 1 | 1 |
| 2-Hydroxy-4-n-octoxy-benzophenone | 1 | 1 | | |

Comparitive Example

The following vinyl stabilizers were blended together to form a solution, 1 g. of which was applied to a 6 in.×6 in. rectangle centered within a 8 in.×8 in. piece of 1.55 lb/sq. yd. commercial, white, flexible vinyl fabric at room temperature. A uniform coating of solution on the vinyl surface was obtained indicating the solution readily wet the vinyl fabric. This solution was not completely absorbed by the vinyl fabric even after 12 days of contact at room temperature.

|  | Parts by weight |
|---|---|
| Epoxidized soybean oil | 5 |
| Barium—Cadmium Stearate | 2 |
| Triphenyl phosphite | 1 |
| 2-Hydroxy-4-n-octoxybenzophenone | 1 |

Comparitive Example

A mineral spirits solution containing the following vinyl stabilizers was applied, 1 g., to a 6 in.×6 in. rectangle centered in an 8 in.×8 in. piece of 1.55 lb./sq. yd. commercial, white, flexible vinyl fabric at room temperature. Although the mineral spirits solution wet the vinyl, no perceptible absorption of the stabilizers into the vinyl occurred in 12 days at room temperature.

| Mineral spirits Varsol #1 | 45 |
|---|---|
| Epoxidized soybean oil | 5 |
| Barium cadmium stearate | 2 |
| Triphenyl phosphite | 1 |
| 2-Hydroxy-4-n-octoxybenzophenone | 1 |

EXAMPLE 4

The following three solutions of vinyl stabilizers dissolved in plasticizer were applied at room temperature, 1 g. each, to a 6 in.×6 in. rectangle centered within an 8 in.×8 in. piece of 1.55 lb./sq. yd. commercial, white, flexible vinyl fabric. All solutions wetted the vinyl fabric. Each solution was completely absorbed by the vinyl fabric at room temperature after less than 30 hours of contact time.

| Solution | Parts by weight | | |
|---|---|---|---|
|  | E | F | G |
| 2,2,4-trimethyl 1,3-pentanediol diisobutyrate | 45 |  |  |
| Diisobutyl phthalate |  | 45 | 45 |
| Diglycidyl ether of Bisphenol A | 5 | 5 | 5 |
| Barium cadmium stearate | 2 | 2 | 2 |
| Tris nonylphenyl phosphite | 1 | 1 | 1 |
| 2-Hydroxy-4-n-octoxybenzophenone | 1 | — | 1 |
| 2-Hydroxy-4-methoxybenzophenone | — | 1 | — |

Comparitive Example

A solution consisting of a blend of the following vinyl stabilizers was applied at room temperature, 1 g., to a 6 in.×6 in. rectangle centered within an 8 in.×8 in. piece of 1.55 lbs./sq. yd. commercial, white, flexible vinyl fabric. The stabilizer solution appears to wet the surface of the fabric. This vinyl stabilizer solution was not absorbed by the fabric even after 12 days of contact time at room temperature.

| Solution | Parts by weight H |
|---|---|
| Diglycidyl ether of Bisphenol A | 5 |
| Barium cadmium stearate | 2 |
| Tris nonylphenyl phosphite | 1 |
| 2-Hydroxy-4-n-octoxybenzophenone | 1 |

EXAMPLE 5

The condensation product of octylphenol with 9–10 moles of ethylene oxide (Triton X-100, Rhom and Haas) 5 parts was dissolved in 100 parts of the diester of phthalic acid with a commercial mixture of Oxo process alcohols. The foregoing blend was emulsified by adding it gradually with vigorous stirring to a solution of 28 Be ammonia, 2 parts, in 93 parts of deionized water. The emulsion, 1.4 g., was applied to a clean 6 in.×6 in. rectangle within a 8 in.×8 in. piece of 1.55 lbs./sq. yd. commercial, white, flexible vinyl fabric at room temperature. Time for the plasticizer solution remaining after the water had evaporated to be absorbed was 27 hours.

EXAMPLE 6

White, flexible vinyl fabric (1.55 lbs./sq. yd.) was cut into 8 in.×8 in. squares. Two grams of a solution of tributyl tin acetate (1 wt. %) in 2,2,4-trimethyl-1,3-pentanediol diisobutyrate plasticizer was applied to a 6 in.×6 in. square within the 8 in.×8 in. piece of fabric. The plasticizer solution was uniformly distributed over the vinyl coated surface of the fabric with an applicator. This solution was completely absorbed by the vinyl fabric within 42 hours at room temperature.

Comparitive Example

Tributyl tin acetate (2 g.) was uniformly spread over the surface of a 6 in.×6 in. square of the vinyl fabric described in example 6. No absorption of the solid tributyl tin acetate was observed after 15 days at room temperature.

While the present invention has been described with respect to introducing UV stabilizers, mildewcides, surfactants, vinyl heat stabilizers, lubricants, bacteriacides, release agents, fragrances, disinfectants, anti-fogging agents, biocides, fungicides, anti-blocking agents, antioxidants, water repellents, and the like it will be evident to one skilled in the art that many other useful substances may be incorporated into vinyl products using the process described in this invention and therefore the scope of this invention should not be construed to be limited only to just those categories of special function additives listed above.

The invention having been described the following is claimed:

1. A process that can be employed in the field for introducing a special function additive selected from the group of substances consisting of UV stabilizers, mildewcides, fragrances, germicides, insecticides, antioxidants, water repellents, anti-fogging agents, biocides, fungicides, thickeners, lubricants, disinfectants, surfactants, bacteriacides, vinyl heat stabilizers, antistats, release agents, and antiblocking agents into an already manufactured and fabricated vinyl film, vinyl sheet, or vinyl coated fabric which process comprises:

(1) spreading on the vinyl surface at ambient temperature a uniform coating of a solution consisting of
  A. a permanent, plasticizer carrier liquid which
   (a) has a vapor pressure less than 150 mm Hg at 200° C.,
   (b) has a solubility parameter between 7.7 and 12.5 (calories/cc.)×0.5,
   (c) has an absorption time less than 10 days at room temperature,
   (d) has a viscosity measured at 20° C. which is less than 79 cp., and
   (e) does not physically or chemically attack flexible polyvinyl chloride products, and
  B. a special function additive which
   (a) imparts to the vinyl some property that it did not possess before,
   (b) is soluble at least to the extent of 0.001 pphr in the plasticizer at 4° C.,
   (c) does not at a minimum concentration of 0.001 pphr increase the absorption time of the plasticizer solution to greater than 30 days at room temperature; and
(2) said vinyl surface to remain undisturbed at ambient temperature until the plasticizer solution has been absorbed into the interior of said vinyl.

2. A process of claim 1 where the liquid plasticizer is selected from the group consisting of 2,2,4-trimethyl-1,3-pentanediol diisobutyrate, diisobutyl phthalate, dibutyl phthalate, dimethyl phthalate, dimethyl azelate, dimethyl adipate, dibutyl adipate, the diester of phthalic acid with a mixture of Oxo process hexyl alcohol isomers, tributoxyethyl phosphate, dibutoxyethyl phthalate, and methyl phthalyl ethyl glycolate.

3. A process of claim 1 wherein the insecticide special function additive is selected from the group consisting of dimethyl dichlorovinyl phosphate, 1-Naphthyl N-methyl carbamate, piperonyl butoxide, and (5-benzylfuryl)methyl 2,2-dimethyl-3-(2-methylpropenyl)cyclopropanecarboxylate.

4. A process of claim 1 where the anti-blocking special function additive is selected from the group consisting of methyl oleate, stearic acid, oleamide, erucaminde, methyl stearate, stearamide, and butyl stearate.

5. A process of claim 1 where the UV stabilizer special function additive is selected from the group consisting of
2-ethylhexyl-2-cyano-3,3-diphenyl acrylate,
2(2-hydroxy-5-methylphenyl)benzotriazole,
4-hydroxy-2,2,6,6-tetramethyl-1-piperidineethanol,
{2,2-thiobis(4-tert-octyl phenolato)}-n-butylamine nickel(II),
2-hydroxy-4-n-octoxybenzophenone and
2-hydroxy-4-methoxybenzophenone.

6. A process of claim 1 where the mildewcide special function additive is selected from the group consisting of dibutyltin oxide, 2-n-octyl-4-isothiazolin-3-one 45% in dipropylene glycol.

7. A process of claim 1 where the vinyl heat stabilizer special function additive is selected from the group consisting of dibutyltin maleate, and a mixture of barium and cadmium stearates.

8. A process of claim 1 where the special function additive fragrance is selected from the group consisting of butyl-methyldihydrocinnamic aldehyde, citral, citral dimethyl acetal, dimethyl hexanediol, citronellal, dihydromyrcenol, geraniol, isoeugenol acetate, hydroxycitronellal, isocinchomeric acid, 7-methoxy-3,7-dimethyloctan-1-al and phenyl propyl isobutyrate.

9. A process of claim 1 where the special function additive lubricant is selected from the group consisting of oleyl alcohol, tristearyl citrate, calcium stearate, and glycerol tristearate.

10. A process of claim 1 where the special function additive disinfectant is selected from the group consisting of dialkyl dimethylammonium halides.

11. A process of claim 1 where the special function additive anti-fogging agent is selected from the group consisting of the fatty acid monoesters of glycerine.

12. A process of claim 1 where the surfactant special function additive is selected from the group consisting of an ethylene oxide polyether of a perfluorinated alcohol, and the condensation product of octyl phenol with 9-10 moles of ethylene oxide.

13. A process of claim 1 where the special function additive antistat is N-ethyl-o,p-toluenesulfonamide.

14. A process of claim 1 where the biocide special function additive is 3-bromo-1-chloro-5,5-dimethyl hydantoin.

15. A process of claim 1 where the antioxidant special function additive is Bisphenol A.

16. A process of claim 1 where the fungicide special function additive is selected from the group consisting of 1,4-bis(bromoacetoxy)-2-chlorothalonil, dinitroacetylphenylcrotonate, zinc pyrithone, and tributyltin fluoride.

17. A process of claim 1 where the special function additive is a mixture of PVC stabilizers consisting of barium cadmium stearate, the diglycidyl ether of Bisphenol A, tris nonylphenyl phosphite, and 2-hydroxy-4-n-octoxybenzophenone.

18. A process of claim 12 where the surfactant special function additive facilitates emulsification of the plasticizer solution in water.

19. A process of claim 1 where the bacteriacide special function additive is selected from the group consisting of tributyl tin acetate, and bis(tri-n-butyltin)sulfosalicylate.

* * * * *